Feb. 11, 1964 J. O. TJEBBEN 3,121,144

SHUTTER MECHANISM EMPLOYING A PAIR OF BLADES TO COVER AN OPENING

Filed Aug. 18, 1960 2 Sheets-Sheet 1

Inventor
John O. Tjebben
by Robert B. Benson
Attorney

Inventor
John O. Tjebben
By Robert B. Benson
Attorney

United States Patent Office 3,121,144
Patented Feb. 11, 1964

3,121,144

SHUTTER MECHANISM EMPLOYING A PAIR OF BLADES TO COVER AN OPENING

John O. Tjebben, Milwaukee, Wis., assignor to Allis-Chalmers Manufacturing Company, Milwaukee, Wis.

Filed Aug. 18, 1960, Ser. No. 50,523
1 Claim. (Cl. 200—50)

This invention relates to closed switchboard structures and more particularly to shutter equipment for controlling communication between juxtapositioned compartments thereof.

Switchboard structures usually employ fixed circuit conductors such as bus bars, electric switches and accessory apparatus. The switches and some associated equipment are often mounted on carriers such as trucks which are moved into and out of suitable compartments arranged within the switchboard structure. Connections between the carrier supported switch and the fixed circuit conductors are established through disconnecting switches having their movable contact members carried by the carriers and their stationary contact member fixedly disposed within the rear compartments of the structures. The fixed circuit conductors and apparatus associated therewith are isolated from the movable switch by a shutter arrangement when the carrier is removed from its compartment. This protects an operator from contact with the fixed members of the disconnecting switch or live conductors associated therewith when he enters the carrier compartment. These shutter arrangements are usually actuated by the movement of the switch carrier. The shutter arrangements of the prior art have been designed so that they block off egress to the live contacts when the switches are out of their cubicles. However, since a switchgear must have its shutters closed when in the inserted test position, it is very desirable, from the standpoint of saving space, to have a shutter mechanism which can be actuated to open position by inserting the carrier a short distance from the test position.

Applicant solves this problem by providing a new and improved type of shutter arrangement which has "split shutters" mounted on axially reciprocating rods in a manner that will enable the shutters to uncover the live conductors by traveling a short distance thereby enabling the switch carrier to open the shutters by being inserted a short distance after its test position.

It is, therefore, an object of this invention to provide a new and improved enclosed switchboard structure.

Also, it is an object of this invention to provide a new and improved enclosed switchboard structure employing control equipment which is physically taken apart during removal of a carrier from the structure to deenergize the equipment.

Further, it is an object of this invention to provide a new and improved enclosed switchboard structure in which a shutter is interposed between the live conductors when a carrier is moved out of a compartment.

A still further object of this invention is to provide a new and improved enclosed switchboard structure wherein control equipment used therein is assembled and disassembled by movement of a switch carrier into and out of the switchboard structure.

Another object of this invention is to provide a new and improved enclosed switchboard structure wherein the movable shutter arrangement can be moved to its open position by a switch carrier being inserted a minimum distance after its test position.

Objects and advantages other than those above set forth will be apparent from the following description when read in connection with the accompanying drawings, in which.

Figure 1:
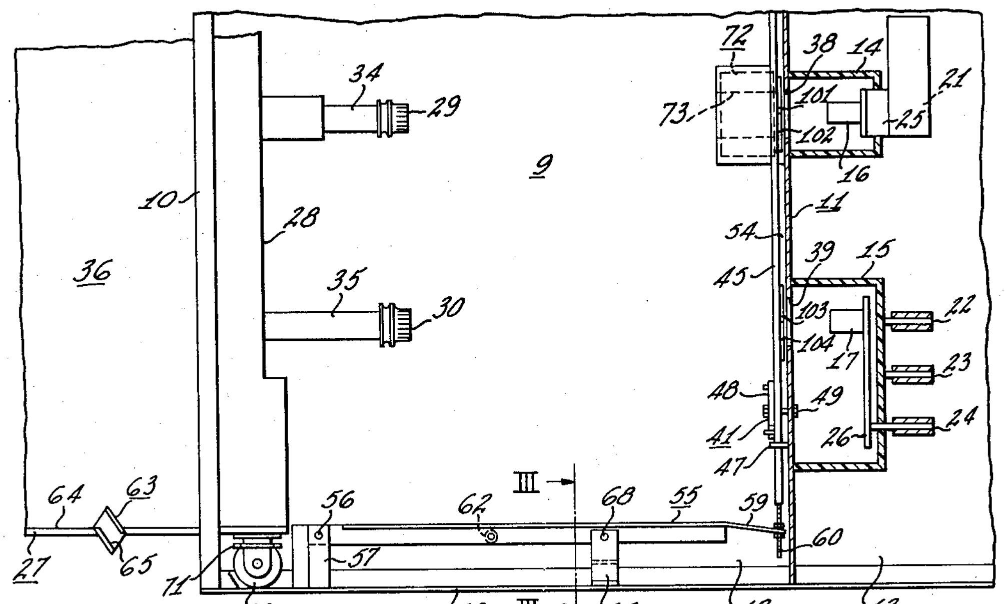
FIG. 1 is a side sectional elevational view of an enclosed switchboard structure and a removable truck with its associated mechanism in partially withdrawn position and embodying the invention.

Referring to the drawings by characters of reference, FIG. 1 illustrates an enclosed switchboard structure comprising a housing 9 having a front upright member 10 and a rearwardly spaced upright member 11 with suitable plates attached to members 10 and 11 to enclosed the space of a first compartment 12 therein and rearward of member 11 to enclose the space of a second compartment 13. Upright member 11 supports a pair of housing elements 14 and 15. A plurality of stationary contact members 16 and 17 are enclosed by housing elements 14 and 15 and comprise the fixed contact members of a disconnecting switch 18. Contact members 16 and 17 are electrically connected to two of a plurality of bus bars 21, 22, 23 and 24 through suitable connectors 25 and 26. Although, in general, enclosed switchboards are provided with a plurality of similar pole structures, one for each phase of a polyphase electric circuit (note FIGS. 4 and 5), only one such pole structure is illustrated in the side elevational views shown in FIGS. 1 and 2.

A movable switch carrier such as a truck 27 is arranged for movement into and out of the housing 9. This truck comprises a framework 28 adapted to support movable contacts 29 and 30 of disconnecting switch 18. Truck 27 is mounted on supporting wheels 32 by which it may be moved into and withdrawn from its enclosing compartment 12. A vertical panel 33 is carried by the truck on the forward face thereof and when the truck is in service position within the switchboard enclosure it forms substantially the closure for the truck compartment. An electric switch such as an air magnetic circuit breaker symbolically shown by a reference character 36 may be carried by the truck frame in the rear of panel 33.

Figures 2, 3:
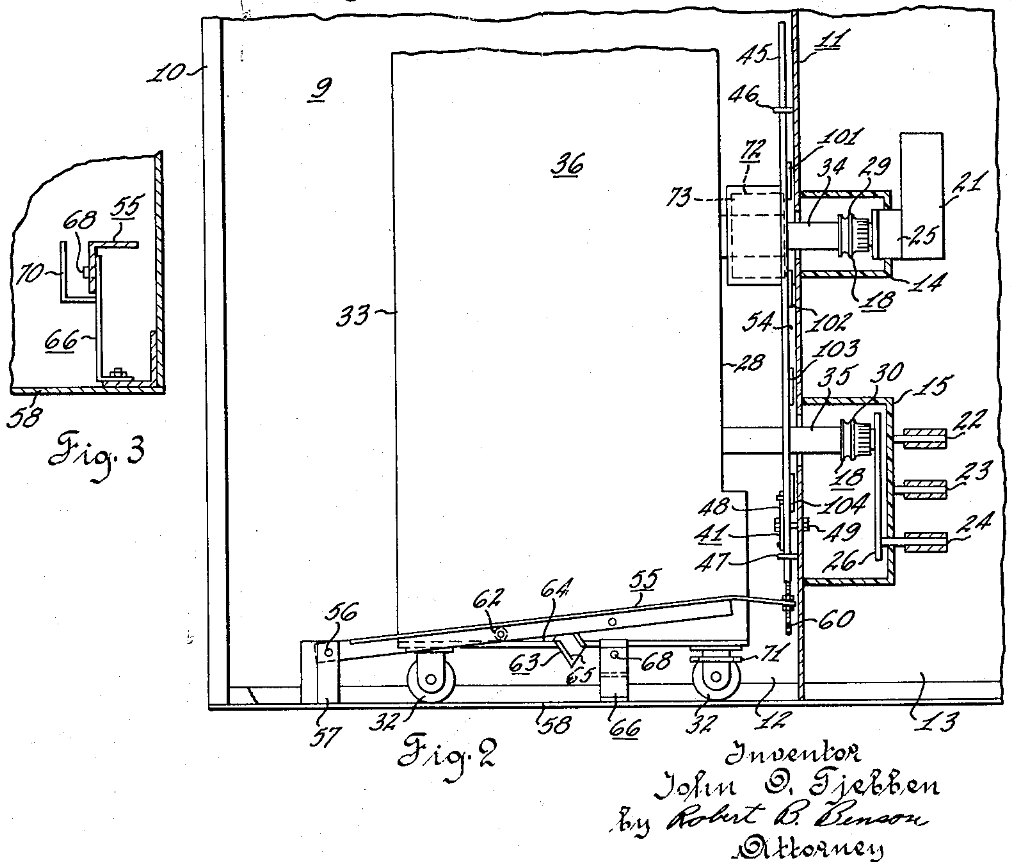
FIG. 2 is a side sectional elevational view similar to FIG. 1 with the truck in fully racked-in position.
FIG. 3 is a sectional view of the racking mechanism that actuates the shutters in its closed position, taken along line III—III of FIG. 1.

A plurality of insulated conductors 34 and 35, here shown as vertically aligned, are carried by the truck frame 28 and are disposed in approximate horizontal alignment with the stationary contact members 16 and 17 of the disconnecting switch 18. These conductors are provided with contact members 29 and 30 at their ends which members are suitably connected electrically with the terminals of the air magnetic circuit breaker 36. When truck 27 is in service position within its compartment 12 in the enclosed switchboard structure as shown in FIG. 2, the movable contact members 29 and 30 engage the fixed contact members 16 and 17 of the disconnecting switch 18. When truck 27 is withdrawn from the enclosed switchboard structure, contact members 16, 29, 17 and 30 are separated thereby disconnecting the air magnetic circuit breaker or other switching device usually mounted on frame 28 of truck 27 from the electric circuit.

Figure 4:
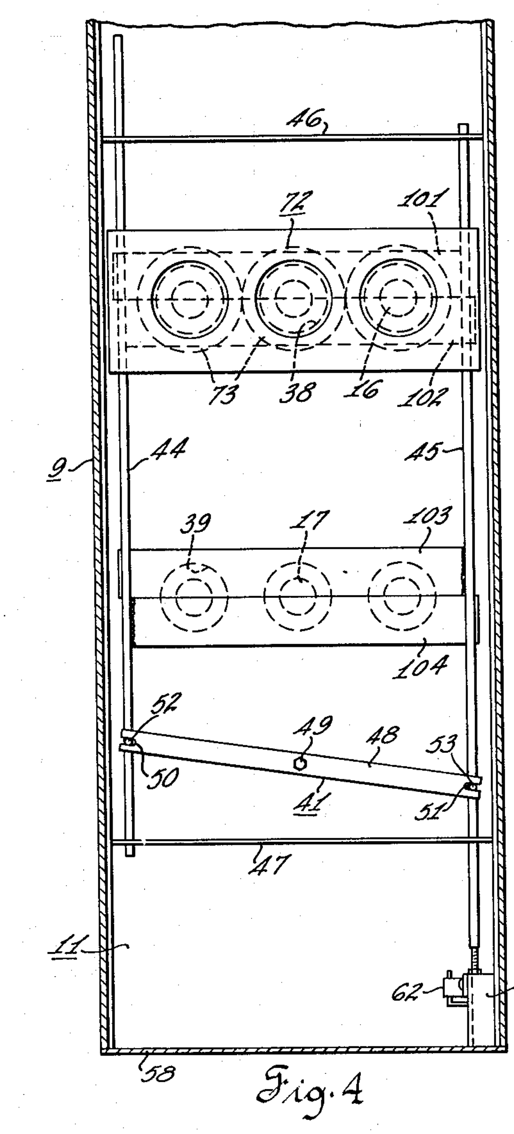
FIG. 4 is a left end sectional elevation view of the enclosed switchboard structure shown in FIGS. 1 and 2 with the truck removed and the new type of "split shutters" shown in the closed position.
Figure 5:
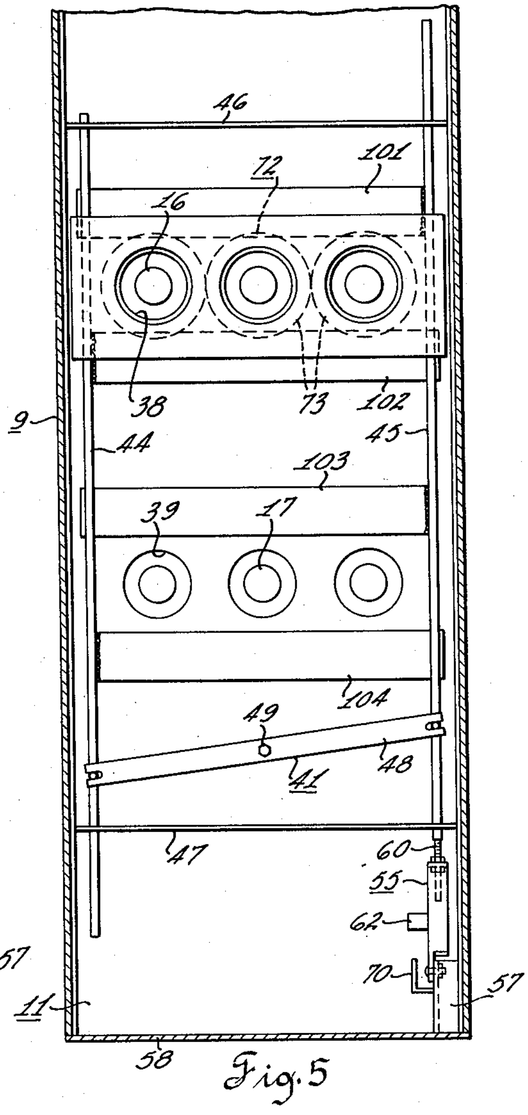
FIG. 5 is a left end sectional elevational view of the structure of FIGS. 1 and 2 with the "split shutters" in the open position.

The stationary contact members 16 and 17 of the disconnecting switch 18 are also the circuit conductors 25 and 26 arranged within compartment 13 and separated from the truck compartment 12 by the upright member 11 which is disposed in the spaced relationship in front of stationary contact members 16 and 17. Upright member 11, as shown in FIGS. 4 and 5, is provided with pairs of apertures 38 and 39 through which movable conductors 34 and 35 and the supported contact members 29 and 30 carried by truck 27 may be extended to make contact with the stationary contact members 16 and 17.

In accordance with the invention claimed, a shutter mechanism 41 is provided to move into shutter closed position to cover apertures 38 and 39 before truck 27 is completely withdrawn from compartment 12 and to move into shutter open position to uncover apertures 38 and 39 after truck 27 is inserted past its test position, but before it is moved completely into its service position within its compartment 12. This new shutter mechanism 41 comprises four vertically spaced plates or blades 101, 102, 103 and 104, which are connected in a counterbalancing arrangement for minimizing force required for actuation thereof. The blades cooperate in pairs to cover the apertures 38 and 39. When moving to the open position shown in FIG. 5, the blades 101 and 103 move upward against the effect of gravity while the other blades 102 and 104 simultaneously move downward under the effects of gravity. When the shutter is actuated to closed position shown in FIG. 4, blades 101 and 103 move down over one-half of apertures 38 and 39 and blades 102 and 104 are moved up over the other one-half of apertures 38 and 39 as shown in FIG. 4.

One blade of each pair of blades is fixedly attached to a different one of a pair of rods 44 and 45 which are mounted to reciprocate axially in opposite directions. As shown in FIGS. 4 and 5, blades 101 and 103 are fixedly attached to rod 45 while blades 102 and 104 are fixedly attached to rod 44.

Rods 44 and 45 are slidably mounted in cross members 46 and 47 which are attached to the frame of the switchboard housing 9. Furthermore, these rods are supported by a member 48 which is pivotally mounted at 49 to housing 9. Member 48 is provided at each end along the longitudinal axis thereof with slots 50 and 51 which provide a loose connection with pins 52 and 53 on rods 44 and 45, respectively, so that when rod 48 is rotated it causes reciprocating movement of rods 44 and 45. Therefore, as member 48 is rotated clockwise, rod 44 moves upward to move blades 102 and 104 over half of their respective apertures and rod 45 moves downward causing blades 101 and 103 to cover the other half of the apertures. The right end of blades 102 and 104 and the left end of blades 101 and 103 are loosely arranged in a slot or track 54 formed between rods 44 and 45 and upright surface 11 as shown in FIG. 1.

The shutter operating mechanism comprises a lever 55 pivotally mounted at 56 to a bracket 57 secured to base 58 on one side of the truck compartment. The rear end 59 of lever 55 is loosely connected to a pin 60 extending from the lower end of rod 45. Pivotal movement of lever 55 causes reciprocating movement of rod 45. Movement of rod 45 causes pivotal movement of member 48 which in turn causes reciprocal movement of rod 44.

Lever 55 is actuated by movement of truck 27 into and out of the truck compartment and is provided with a roller 62 journaled on a shaft mount on the outer side thereof. The lever is held in its closed position (shown in FIG. 1) by a pin 68 on a bracket 66 (shown in detail in FIG. 3) which is bolted to the bottom of the housing 9. When the truck 27 is moved into the housing 9, a disk member 71, which is associated with one of the carrier wheels, contacts an arm 70 on bracket 66 to release the lever 55. As the truck 27 advances, roller 62 engages with a cam 63 which is mounted on the truck. The cam has a channel 65 on its inside. As roller 62 engages the cam element 63, it moves along the channel 65 therein until the roller reaches a horizontal surface or cam plate 64 on truck 27. Cam plate 64 extends laterally from the body of truck 27 and is disposed to provide a bearing surface for roller 62 during a predetermined movement of truck 27. During the movement of roller 62 through the slot of cam element 63, lever 55 is rotated counterclockwise, to the position shown in FIGS. 2 and 5, thereby raising rod 45 and causing shutters 101 and 103 to move to shutter open position and lowering rod 44 thereby causing shutters 102 and 104 to also move to shutter open position. When truck 27 is removed from the truck compartment, roller 62 is caused to roll along surface 64 until it reaches the cam 63. Upon reaching cam 63, roller 62 moves through the channel 65 to a lower level thereby rotating lever 55 clockwise as shown in FIGS. 1 and 4 to shutter closed position.

FIGS. 1, 2, 4 and 5 illustrate a plurality of current transformers 72 mounted in the truck compartment against the upright surface 11. These transformers each comprise an aperture coil 73 arranged around and juxtaposed to a different one of apertures 38. Although current transformers 72 are shown only around apertures 38 they may be positioned also around apertures 39. The shutter blades 101 and 102 of shutter 41 are arranged to move between coils 73 and apertures 38 within the truck compartment. Coils 73 are so aligned that when conductor 34 together with movable contacts 29 and 30 pass therethrough, upon truck 27 being moved into the truck compartment, conductor 34 becomes the primary conductor of the current transformers 72.

A complete cycle of operation of the shutter structure is as follows:

The shutter blades 101, 102, 103 and 104 are in shutter closed position as the truck 27 is rolled into the truck compartment 12 of the enclosed switchboard structure. Part way in the truck compartment, roller 62 engages cam 63 and it is forced to ride along the channel 65. This action elevates shutter lift lever 55 which pivots about pivot 56. Counterclockwise rotation of lever 55 lifts rod 45 vertically. Although lever 55 moves in an arc whose center is at pivot 56, the loose joining of lever 55 to rod 45 results in vertical straight line travel of rod 45. As rod 45 is raised up rod 48 loosely connected thereto pivots counterclockwise about pin 49 and results in a downward movement of rod 44. As rod 45 and shutter blades 101 and 103 move upward, rod 44 and shutter blades 102 and 104 move downward. This positive and substantially simultaneous action results in the blades exposing apertures 38 and 39 and being locked in that position by the frame of truck 27.

As truck 27 is withdrawn from the truck compartment the above action is reversed. Roller 62 rides along the channel 65 in cam element 63. This causes clockwise rotation of lever 55 and the raising of rod 44 and the lowering of rod 45 which actuate their respective shutters to close apertures 39 and 38, respectively.

The provided shutter mechanism can be opened by the switch carrier traveling a short distance after its test position because the shutter blades of the shutter mechanism travel half the diameter of the holes they cover. The rod 45 need only be actuated half as far as it would for a full sized shutter blade and, therefore, the roller 62 need only travel along cam 65 for a shorter distance to move the rod half as high. Accordingly, this invention has presented an improvement over prior art circuit breakers of the type employing one piece shutters that completely cover their respective apertures.

Although but one embodiment of the present invention has been illustrated and described, it will be apparent to those skilled in the art that various changes and modifications may be made therein without departing from the spirit of the invention or from the scope of the appended claim.

Having now particularly described and ascertained the nature of my said invention and the manner in which it is to be performed, I declare that what I claim is:

A horizontally withdrawable switch having a housing with a pair of compartments with an opening therebetween comprising: a stationary electrical contact positioned in one of said compartments and aligned with said opening;

a movable electrical contact having one end adapted to pass through said opening and engage said stationary electrical contact, said opening being large enough for the passage of said one end of said movable contact but not large enough for the simultaneous passage of more than one movable contact; and a shutter mechanism having a pair of spaced apart rods connected to said housing to axially reciprocate in a plane substantially parallel to the plane of said opening, a pair of blades attached to said rods and disposed in the space therebetween, said blades having an open and closed position, said pair of blades being capable of covering said opening and each blade of said pair being capable of covering a portion of said opening, one blade of said pair being connected to a different one of said rods, a switch carrier having mounted thereon said movable contact, said switch carrier being adapted to engage and actuate said rods to move said blades in opposite directions to said open position before the passage of said movable contact through said opening to engage said stationary contact, and to said closed position after the withdrawal of said movable contact from engagement with said stationary contact and through said opening.

References Cited in the file of this patent

UNITED STATES PATENTS

| | | |
|---|---|---|
| 2,258,150 | Scott | Oct. 7, 1941 |
| 3,015,756 | Kreekon et al. | Jan. 2, 1962 |

FOREIGN PATENTS

| | | |
|---|---|---|
| 524,789 | Italy | Apr. 29, 1955 |
| 807,952 | Great Britain | Jan. 28, 1959 |